Patented Jan. 15, 1929.

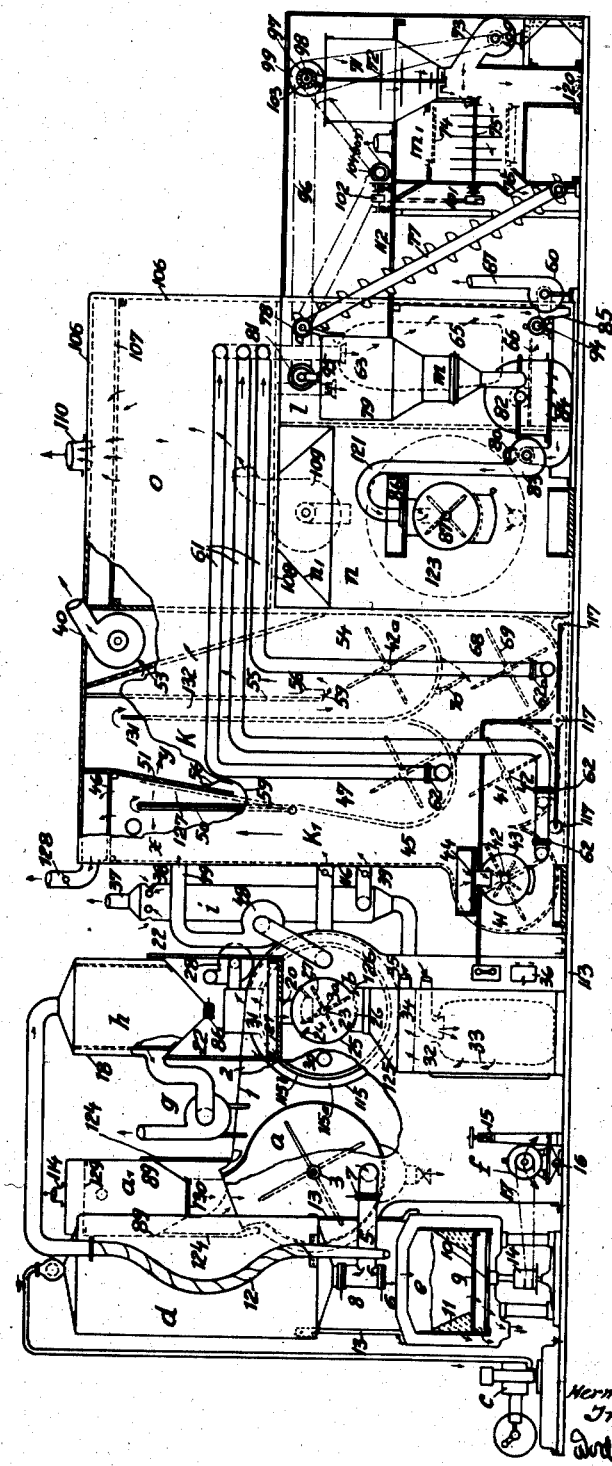

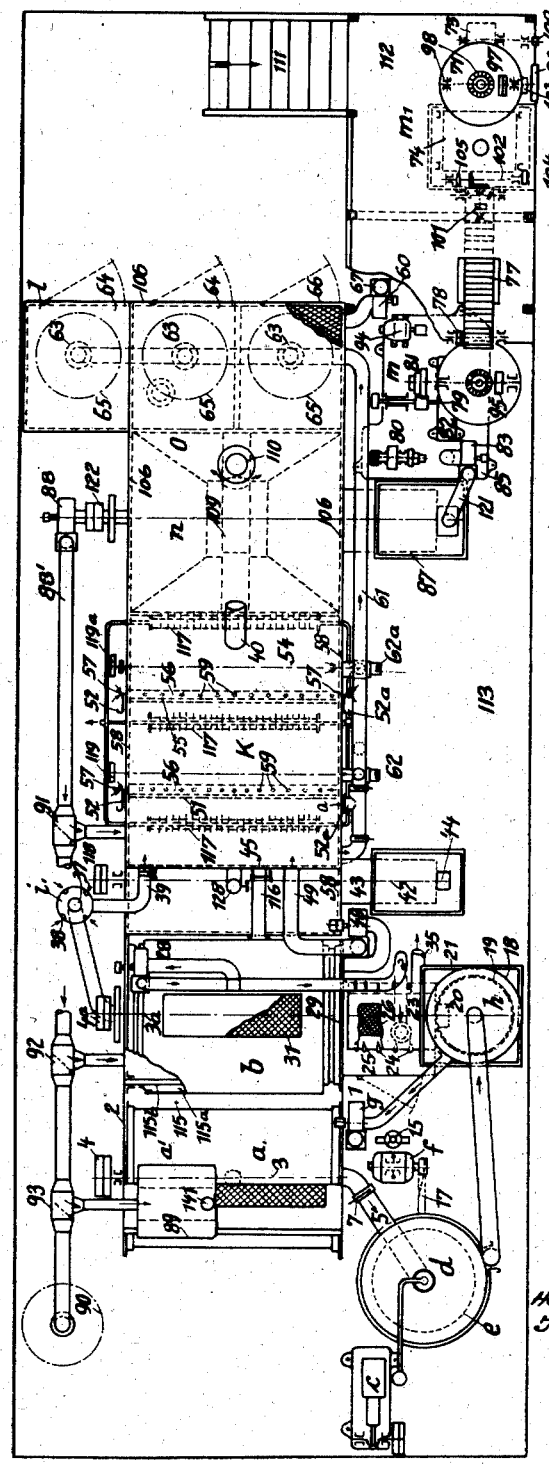

1,699,041

UNITED STATES PATENT OFFICE.

HERMAN BAUER, OF STUTTGART, GERMANY.

MACHINE FOR TREATING FEATHERS FOR USE IN BEDS AND THE LIKE.

Application filed May 31, 1927, Serial No. 195,559, and in Germany May 1, 1926.

My invention relates to a plant for preparing raw feathers by a number of successive operations, as separating therefrom foreign matter, dry cleaning, washing, drying, damping, disinfecting, sorting and sacking, so as to render them fit for use as bed or other feathers, and it is the object of my invention to so perform the whole treatment of the feathers, and to so design my plant, as to exclude handling of the feathers throughout the treatment thereof and to subject them to the action of mechanical and pneumatic means only.

In the treatment of feathers as performed heretofore in a series of single machines, handling of the feathers intermediate the several stages of treatment was inevitable, involving extra labor and cost, loss damage by careless handling, and theft.

By treating the feathers successively in separate machines for carrying out the various operations required it is indispensable to manually transfer the feathers from one machine to a conveying device and to then convey them to the next following machine. In the plant constructed according to the present invention, however, such manual operations are entirely dispensed with, since all work required for treating either old or new feathers is automatically done by the plant. The plant according to the present invention, thus represents a new combination of parts and devices constructed and arranged in a particular manner to perform in succession all the operations required.

I am aware that various parts of my plant are old in this art, but I am not aware that heretofore a combined plant has ever been suggested in which handling of the feathers is eliminated throughout.

Since bed-feathers are to be treated partly in a dry state and partly in a wet state according to the invention, I have divided the single apparatus or devices into three groups: the first for dry treatment, the second for wet treatment and the third for dry treatment, and have combined these three groups with suitable conveying means into a closed plant for the whole treatment of raw bed-feathers in such manner that the raw dry-feathers are conveyed by fans sucking in the feathers together with a stream of air from the foregoing apparatus and blowing the feathers together with the air into the following apparatus, while in wet state the feathers are sucked in by evacuable tanks from each foregoing apparatus and are dropped by gravity from the tanks into each following apparatus. The use of such tanks for conveying the wet feathers is necessary, since it is impossible to drive the wet feathers through the fans.

In order that it may be possible to drive the feathers through the whole plant without handling them manually, it is advisable to arrange at the beginning of the plant a device for separating heavy foreign substances, for instance, a gravity device connected to the plant by a mechanical conveyor.

If heavy foreign substances are brought into the plant they can cause a heating of the feathers in such a degree, that all feathers are burnt up.

According to the invention, the several chambers of the sorting device are each connected with a separate sacking-chamber and one fan only is arranged for evacuating all sacking-chambers and behind these chambers, so that by one fan the sacks in the sacking chambers can be filled without damaging the finished feathers by driving them through the fan.

The invention therefore resides in the special subdivision of the single devices or apparatus in two groups and combining these groups with special conveying means according to the dry or wet state of the feathers as well as to the rate of finish, so that the feathers can be conveyed through the automatic plant in any state and without injury of the finished feathers.

Finally, a special flexible sucking conduit is arranged for removing the wet feathers from the centrifugal device into the following tank.

The plant as a whole is designed for the treatment of new raw feathers. In order to treat in the plant old worn feathers for cleaning and sorting purposes, means are provided to drive the feathers through a part of the machine only for dry cleaning or sorting the feathers.

With the above recited invention features and objects in view, reference is had to the following specification and drawings in which there is exhibited one example or embodiment of the invention which in no way is intended as a limitation upon the scope of the appended claims as it is to be clearly understood that variations and modifications which fairly fall within the true scope of said claims, may be resorted to when found expedient.

In the accompanying drawings forming a part of this specification and showing, as above indicated, for purposes of exemplification, a preferred form and manner in which the invention may be embodied and practiced but without limiting the claimed invention to such illustrative instance:

Figure 1 is a view of the machine in front elevation, and figure 2 is a view in top plan, both views being shown partly in section.

Referring now to the drawings, 71 is a feeding funnel for receiving the feathers, $m_1$ is a gravity separator where stones, etc. are removed from the feathers. 77 is a bucket conveyor to which the feathers are delivered; $m$ is a feeding apparatus at the upper end of the conveyor 77; 82 is a disintegrator in which the feathers are reduced to a given size if too large; 83 is a fan drawing the feathers from the disintegrator 82; 87 is a beater to which the fan 83 delivers and which removes from the feathers coarse dust particles, etc.; $n$ is a screening chamber having a screen cylinder 123 connected with the beater 87; 109 is a fan drawing the finer dust particles from the cylinder, on the outside; 88 is a fan drawing the feathers from the screen on the inside; 88' is the delivery pipe of the fan; 93 is a valve near the other end of the pipe 88'; and $a_1$ is a receiver to which the feathers are delivered by the pipe 88'. The dry cleaning of the feathers is now finished and they are allowed to collect in the receiver.

130 is a valve at the bottom of the receiver $a_1$; $a$ is a washing drum below the valve to which the feathers are delivered from the receiver when the valve is opened, means, not shown, being provided for supplying water to the drum $a$; 5 is a T-pipe having valves 6, 7 and 8 and connected at one end to the drum $a$ and at the other to a storage cylinder $d$; $c$ is a pump drawing air from the cylinder $d$ so that the feathers from $a$ are drawn into the cylinder when the valves 7 and 8 are opened; $e$ is a centrifugal bowl arranged below the cylinder $d$ and adapted to receive the wet feathers from the cylinder $d$ after the pump $c$ has been arrested and the valve 7 has been closed and the valves 6 and 8 have been opened. $h$ is a vacuum cylinder connected with a fan $g$ and a flexible tube 12 which is adapted to be placed in contact with the mass of partly dry feathers 11 in the bowl $e$ so that the feathers are drawn into the cylinder $h$ without getting into the fan $g$ which, being wet, they would clog; 86' is a valve at the bottom of the vacuum cylinder $h$; 25 is a beater into which the feathers are dropped from the valve after, of course, the fan $g$ has been arrested; $b$ is a heated drying chamber connected with the beater 25; 28 is a fan for sucking the feathers into the device $b$, while the remaining foreign matter is collected in a sack 33; and 48 is a fan drawing the feathers from the drying chamber $b$ and delivering them to the sorting apparatus $k'$, $k$ through a pipe 49.

At 36 is a boiler furnace in which steam is generated and supplied to a heating jacket $115^b$ of the drier $b$; $i$ is a heater in which the chimney 37 is surrounded by a jacket having openings 38 at the top; and 39 is a pipe through which the air heated in $i$ is delivered to the chamber $k'$ of the sorting apparatus. This apparatus is subdivided into three compartments, $l$ is a set of three sack chambers, 61 are three pipes each connecting one of the compartments with one of the sack chambers $l$, and 60 is a fan drawing from the sack chambers.

I will now describe the apparatus in more detail. At one end of the base plate 113 of the apparatus or machine, an elevated platform 112 with steps 111 is provided for giving access to the gravity separator $m_1$. The separator is provided with a feeding funnel 71 for receiving the feathers to be treated, which is inserted in the platform 112. Mounted in suitable bearings in the funnel is a feeder 72 comprising a vertical shaft with a number of feeding arms and adapted to be revolved by a bevel gear system 98 keyed to the feeder shaft and a horizontal shaft carrying a pulley 97 for the driving belt. The material to be treated in the machine is gradually fed by the described mechanism from the funnel down in front of the discharging orifice or nozzle of a fan or blower 73 adapted to be driven by the revolving shaft of the pulley 97 through the agency of a suitable belt driving 99, 100. The blower 73 causes the light particles of the material, that is the feathers, to fly into a sifting cylinder 74 whilst the heavy particles or impurities such as iron and stony bodies, at the same time drop into a box 120 due to gravity. Mounted in the cylinder 74 is a feeder or conveyer 75 comprising a horizontal shaft with arms supported in appropriate bearings and carrying on its free outer end a pulley 101 positively connected by a belt with a lay shaft and pulley 102 for driving purposes. The conveyer 75 causes the light material, that is the feathers, devoid of any heavy admixtures or impurities, to pass through a discharge opening to a scoop-conveyer 77.

Motion is imparted to the conveyer 77 by a belt in frictional engagement with a pulley 78 and a pulley 105 keyed to an intermediate horizontal driving shaft 104, and the conveyer acts to transfer the material into the automatic feeding or filling apparatus $m$ having a hopper 79 provided with an intermediate gearing 80, 81 for the driving purpose. Automatic apparatus of the kind are known in themselves and, therefore, I deem it unnecessary to describe the same more in detail. The material is supplied from and by the apparatus 79 to the batting, breaking and tearing machine 82 in which the larger feathers are torn, and an exhausting machine 83 acts to suck off the comminuted material through a channel 84 of iron cast in one with the base plate 85 of the machine 82. The tubular conduit 121 of the exhausting machine 83 conveys the material to the charging orifice 86 of a cylinder or drum 87 equipped with a revolving batting shaft duly supported in suitable bearings and provided with a pulley 122 at its outer end for the driving purpose. The batting arms of the shaft act to beat the material and throw the same over and over in order to separate therefrom coarse dust and minute particles.

On its further travel through the machine the material is caused to pass through a sifting cylinder 123 for the purpose of being freed from all fine dust which is sucked off from the purifying device $n$ by means of a suitable blower or fan 109 and collected in a dust chamber $o$. The latter is immediately united with the casing or chamber of the purifying device $n$ and constituted by outer walls or plates 106 and a perforated false top plate 107 a short distance below the real top wall 106'. The perforations of the plate 107 are so small that the dust particles are retained but the air will be allowed to escape. The bottom plate 108 of the dust chamber $o$ is located to form at the same time the top of the purifying device or chamber $n$ and in the top plate 106' a short tube or chimney 110 is provided for the air to escape therethrough into the atmosphere.

The material thus purified in a dry way, is sucked off from the sifting cylinder 123 by an exhauster or fan 88 and conveyed through a conduit 88' to a collecting chamber $a'$ through the valve 93, the chamber $a'$ having walls 89, see Figure 1, left hand side, and in which, while the valve 130 is closed, the material composed of mixed feathers of various size and shape accumulates whilst the air is allowed to escape through the sieve 129 and the outlet 114 into the atmosphere. The collector $a'$ is connected with the lateral walls 1 and 2 of the machine extending from end to end, by means of brackets 124. Upon opening the valve 130 the material is allowed to pass to a washing drum $a$ in which it is mixed with water and subjected to the usual washing operation which is carried out in a known manner by means of stirring arms firmly connected to a horizontal shaft 3 provided with a pulley 4 at its outer end for the driving purpose.

At the end of the washing operation the washed material is allowed to pass to a collecting cylinder $d$ after fresh pure water has been admitted. To this end the valve 6 is to be closed and the valves 7 and 8 are to be opened while the cylinder $d$ is to be evacuated by means of an air-pump $c$. The valve 6 of the cylinder $d$ is located above the centrifugal mahcine $e$ and the latter is firmly connected with the cylinder $d$ by means of supporting bars 13. Hence the mixture of feathers and water will flow when the air-pump $c$ is stopped, the valve 7 closed and the valves 6 and 8 are opened, immediately into the centrifugal machine $e$.

The centrifugal machine $e$ has a perforated bottom 9 a short distance above the real bottom so as to allow the bulk of water to flow off before the machine is set to work since the perforations provided in the circumferential or side wall of the machine, alone are not sufficient to allow all of the escapable water to flow off. The true bottom 10 of the machine is provided with an opening or openings for the water to flow into the casing of the machine and thence through a discharge opening into any suitable container, without coming in contact with the gearing.

Heretofore it was usual to manually place the washed feathers in perforated tanks for the purpose of allowing water to trickle off, and to subsequently transfer the still wet material by hand into a centrifugal machine for further treatment. The time-consuming manual operations are thoroughly avoided in my improved machine by the provision of the sieve-bottom 9 and the discharging bottom 10 of the centrifugal machine. In the machine constructed according to my invention a further important feature resides in the fact that the material and the washing water can be immediately, if desired or required, discharged from the washing drum $a$ into the centrifugal machine without flowing through the collecting cylinder $d$.

The revolving cylinder of the centrifugal machine is mounted on a vertical revoluble shaft duly supported in suitable bearings and adapted to be driven by an electric motor $f$. The latter is mounted on a base plate capable of rocking or swinging about a horizontal axis 16, that is to say; the base plate with the motor rigidly connected therewith is adapted to be moved to and fro in the directions indicated by the arrows in Figure 1, by means of a spindle with hand-wheel 15 which also serves to secure the base plate in its set position. As regards the purpose of this arrangement it will be seen that the driving belt 17 of the centrifugal machine can be slowly tightened when the machine is to be started, by turning the hand-wheel 15—and consequently the motor—in one direction in order to obtain the required force of acceleration, and when the machine is running at full speed, the belt 17 again may be released a little by turning the hand-wheel in the other direction in order to preserve the belt 17, to save power and to prevent the bearings of the centrifugal machine $e$ and of the motor $f$ from premature wear and tear.

I desire to have it understood that the particular arrangement for starting the centrifugal machine as hereinbefore described, is of general importance and may be used in connection with centrifugal machines of various types or, in general, with quick running machines of many a type, particularly if electric motors are employed which as will be known to persons versed in the art, have a very high starting momentum which automatically decreases in accordance with increasing speed.

Returning now to the centrifugal machine, $e$, the material 11 sticking to the circumferential wall is to be detached therefrom by hand when the dewatering operation is finished, and subsequently conveyed to a cylinder $h$ pneumatically by means of a flexible conduit or sucking nozzle 12. The cylinder $h$ is mounted on supporting bars 22 above a steaming, disinfecting and drying apparatus $b$ with its discharging opening in vertical alinement with the admission opening 20 leading to the apparatus $b$ so that the material can drop into the latter. The apparatus $b$ thus is filled with the moist material for the drying process. Preferably, however, I provide a device 23 for dismembering lumps of clogged feathers and for separating fragments and foreign bodies from the still moist material, at a place intermediate between the cylinder $h$ and the apparatus $b$ whereby the machine will be rendered useful also for treating old worn feathers by way of a dry-purifying process. A device 23 of the kind may comprise a horizontal cylinder 25 having a revolving shaft $3^a$ with batting arms or vanes and equipped, at its lower end, with a sieve 26 and at its inner circumferential surface with pegs or hooks 24 for the purpose of dismembering or tearing the lumps of feathers during the revolutions of the cylinder 25, whilst at the same time small particles of broken feathers, sand and the like will separate from the material by dropping through the sieve 26 into a case 125. Air holes 126 may be provided for the admission of fresh air to the cylinder 25 and the interior 30 of the apparatus $b$ and a separate blower or fan 28 may be employed for sucking such air through the same.

In this manner useful constituents of the material only are conveyed by the air current in to the apparatus $b$ whereas all heavy foreign matter will drop through the sieve 26 as the air current cannot convey them along with it. Thus all useless and injurious substances or constituents are reliably eliminated from the material ere the latter passes through the steaming, disinfecting and drying apparatus $b$. The ventilator 28 also acts at the same time to suck off, through the sieve 31 of the apparatus $b$, the fine dust particles which still adhere to the feather material and causes them to accumulate in a sack 33 provided in the dust filter box 32 below the cylinder 23. The dust filter box 32 is equipped with a fine sieve 34 for the purified air to pass therethrough on its way to the outlet tube 35 leading to the open air. I wish it to be understood that in the present machine the material is conveyed through the purifying, steaming, disinfecting and drying apparatus by suction which is a noticeable improvement on the prior art in which the material is forced through the apparatus by currents of pressure air involving an objectionable development of dust in the working rooms.

The exhaust-gases of the furnace 36 of the steam generator of the steaming and drying apparatus $b$ are economized by causing them to flow through the device $i$ for heating fresh air on the known counter-current principle. Fresh air is admitted through openings 38 at the top of the heating cylinder and caused, on having been heated, to pass through the tube 39 into the first chamber 45 of the sorting apparatus $k$ for the purpose of subjecting the material to a final drying operation in the chamber 45. The thus utilized exhaust-gases then are allowed to escape into the open air through a tube 37 at the top of the cylinder $i$. Moreover, heated air is introduced into the sorting apparatus $k$ from the steaming, disinfecting and drying apparatus $b$ which is heated by steam. The heating jacket $115^b$ of the apparatus $b$ is surrounded by a second jacket 115 spaced to form a cylindrical or annular air chamber $115^a$ between the two jackets. In this chamber $115^a$ air is preheated in order to economize the heating effect of the steam in the jacket $115^b$, and the thus preheated air is conveyed to the sorting apparatus. The air heated in the chamber $115^a$ obviously may likewise be conveyed either totally or partly to the apparatus $b$ in order to carry off the moisture evolved from the wet feathers, with greater speed. Furthermore the sorting apparatus is heated directly from below by means of heating bodies 117 located immediately below the sorting cylinder 41 so that the feathers will more readily rise in the chambers 45 and 47. Steam is supplied to the heating bodies 117 from the steaming, disinfecting and drying apparatus $b$. As feathers are very light in weight and heat produced at the bottom of the sorting apparatus will act to lift the feathers, a comparatively slight current of air only is required for causing the lightest feathers to flow in a certain direction. In this way a more accurate and delicate sorting will be obtained.

The additional heating of the material also involves a considerable saving of power and the expenditure of power, therefore, required in my improved machine for generating a sufficient draft or air current is by far less than in the machines hitherto suggested for similar purposes. Besides that the additional heating affords the advantage of assisting in the drying operation.

Near the bottom of the first sorting chamber 45 I usually provide two stirring devices 41 as it is impossible to work up, by means of a single stirrer only and considering the available dimensions of the chamber, the quantities of material delivered to the sorting apparatus of the machine. The material treated in the steaming, disinfecting and drying apparatus b, as hereinbefore explained, is sucked out from the inner space 30 of the apparatus b by means of a blower or fan 48 and blown into the first chamber 45 of the sorting apparatus k. The material thus blown in deposits in the chamber 45 when the passage 127 between a stationary wall 51 and a movable wall 50 is closed by turning the wall 50 about its pivotal axis in the direction y of the arrow shown in Figure 1, that is in right hand direction, so that the two walls will lie close by each other and the passage 127 leading from the chamber 45 to the second sorting chamber will be shut. The wall 50 in its shut position is shown in Figure 1 in dotted lines. The air escapes from the chamber 45 through the sieve 46 and the outlet tube 128 into the open air. The rear part k' of the sorting apparatus thus forms a closed compartment for cooling and drying purposes.

In the sorting operation that is when the wall 50 is in open position, as shown in full lines, the material takes the usual way, that is to say, it is raised in the chamber 45 and then goes down through the passage 127 into the chamber 47. The coarser and heavier feathers of the material drop to the bottom of the chamber 47, but the finer and lighter feathers thereof rise through the passage 131 and thereafter move downwards through the passage 132 into the third chamber 54, so that the finest feathers or downs will deposit in the chamber 54, the somewhat coarser feathers will accumulate in the chamber 47 and the coarsest feathers pile up in the chamber 45. The material is discharged pneumatically from the several chambers 45, 47, 54 and to this end a fan 60 is provided for sucking the feathers and downs, either in succession or simultaneously, into the sacking chambers 64. The latter are provided with a safety bottom 66 of wire-gauze for the reception of feathers which escape at the sacking operation in case that the sacks 65 are not tight or damaged or for any other reasons. The single sorting chambers are connected with the corresponding sacking chambers by individual conduits 61 having each a slide-valve 62, 62ᵃ so that the conduits can be closed when required. When the said silde-valves are open and the fan 60 is running, the different sorts of the treated material such as coarse feathers, fine feathers and downs, are automatically sucked into the sacks 65 placed in the corresponding sacking chambers, without travelling on any conveying means except in the smooth conduits 61 so that there is no liability to injury due to conveying vanes and the like as hitherto happened in machines of old construction, and the accurately sorted material is properly sacked for dispatch without being damaged due to objectionable handling. It will be seen that the chamber 54 discharges into a chamber 68 when the flap valve 70 is in its opened position, and the material deposited in the chamber 68 is removed therefrom by suction in the manner described, after the flap valve 70 has been closed and the slide-valve 62ᵃ opened, and conveyed to one of the sacks 65.

On the partition walls 51 and 55 of the sorting apparatus k channels 56 for the introduction of fresh air are provided. The two channels extend transversely across the full width of the apparatus so as to communicate with the outer air by means of openings 57 provided in the side walls 58. In the bottom of the channels 56 there are provided holes 59 for the air to discharge into the two chambers 47 and 54. The openings 57 are controlled by adjusting valves, preferably slide valves 52 and 52ᵃ, respectively, for the purpose of regulating individually the speed at which the air is sucked out from the single chambers by the fan 40, either to retard or to accelerate the same so as to accurately adjust the action of the fan with regard to the desired removal of the material from the several sorting chambers and the transfer of the different sorts of feathers to the sacks 65 in the sacking chambers.

The controllable admission of fresh air to the chambers of a sorting machine and the adjustability of the fan action inherent thereto are novel in themselves as far as my knowledge goes. In sorting machines as heretofore constructed the air current produced by a single fan is controlled or regulated by means of slide valves only provided for the purpose in the single chambers. This way of adjustment, however, is objectionable for the reason that by throttling at single or particular places the total amount of available air will be reduced and consequently the efficiency of the apparatus or machine will be decreased. These disadvantages are effectively avoided by supplying secondary air in the individual chambers as hereinbefore described.

For the eventuality of using the sorting apparatus $k$ of the machine alone, that is independently of the other apparatus and devices constituting the machine, by supplying the material to be sorted immediately to the sorting apparatus, I provide a supplemental cylinder 43 with a batting shaft 42 for the purpose of purifying the material and, if required, separating therefrom fragmentary particles and heavy foreign matter. The shaft 42 is driven by a belt running over the pulley 118 keyed to the shaft which at the same time is the operating shaft of the sorting cylinder 41.

I deem it unnecessary to describe the arrangement more in detail or, generally speaking, to explain all of the minute details of the construction of the machine for it will be understood by those to whom this specification is addressed, that the parts or details not shown or described, will necessarily be of the usual size and relationship and will be properly mounted and supported according to the tenets of machine construction. Nor does it seem necessary to reiterate the operation of the joint machine, for the operation of the several devices, apparatus and the like combined therein has been described in detail.

What I claim is:

A plant for treating feathers comprising a feather feed station and a feather delivery station, a piece of apparatus at said feather feed station into which feathers to be treated are adapted initially to be placed, several other different pieces of apparatus each for performing a different operation on the feathers and through which the feathers are adapted successively to be passed, feather conveying means connecting each successive pair of said pieces of apparatus, the piece of apparatus through which the feathers last pass being located at said feather delivery station and the latter being located directly adjacent to said feather feed station.

In testimony whereof, I have signed my name to this specification, this seventeenth day of May, 1927.

HERMAN BAUER.